United States Patent
Dietl

(10) Patent No.: US 6,820,916 B2
(45) Date of Patent: Nov. 23, 2004

(54) ACTUATING DEVICE FOR THE FOLDING ROOF OF A MOTOR VEHICLE

(75) Inventor: Rudolf Dietl, Munich (DE)

(73) Assignee: Webasto Vehicle Systems International GmbH, Stockdorf (DE)

( * ) Notice: Subject to any disclaimer, the term of this patent is extended or adjusted under 35 U.S.C. 154(b) by 1 day.

(21) Appl. No.: 10/350,335

(22) Filed: Jan. 24, 2003

(65) Prior Publication Data

US 2003/0155795 A1 Aug. 21, 2003

(30) Foreign Application Priority Data

Jan. 27, 2002 (DE) .......................................... 102 03 204

(51) Int. Cl.$^7$ ................................................ B60J 7/06
(52) U.S. Cl. ............................. 296/107.13; 296/107.18; 296/222
(58) Field of Search ............................ 296/107.09, 224, 296/107.01, 112, 115, 117, 107.11, 107.13, 107.18, 107.19, 219, 222, 223

(56) References Cited

U.S. PATENT DOCUMENTS

| | | | | |
|---|---|---|---|---|
| 3,981,531 A | * | 9/1976 | Koral et al. | 296/222 |
| 5,092,651 A | * | 3/1992 | Baldwin et al. | 296/223 |
| 6,561,566 B2 | * | 5/2003 | Dintner et al. | 296/107.09 |
| 6,659,541 B1 | * | 12/2003 | Guicheteau | 296/216.02 |

FOREIGN PATENT DOCUMENTS

EP 0 755 815 A1 9/1996

* cited by examiner

*Primary Examiner*—Patricia Engle
(74) *Attorney, Agent, or Firm*—Nixon Peabody LLP; David S. Safran

(57) ABSTRACT

An actuating device for opening and closing a folding roof (2) of a motor vehicle with a bearing carriage (3) which is movably supported on a roof-side guideway (4) and which is connected to the movable part (7) of the folding roof (2), and with a drive means which is connected to the bearing carriage (3) by a drive carriage (10) which is supported on the roof-side guideway (11) and a connecting rod arrangement (13, 14) which has a toggle lever (14) and which is controlled by a control guideway (23), on the last portion of the closing path, the connecting rod arrangement (13, 14) steps down the drive motion of the drive carriage (10). To improve the behavior of the actuating device in the closed state, it is provided that the toggle lever (14) of the connecting rod arrangement which is pivotally connected to the pivot arm (15) of the bearing carriage (3) can be moved along the control guideway (23) into a closed position in which it exhibits a self-locking behavior with respect to opening forces which act on the bearing carriage (3) via the roof part (7).

13 Claims, 10 Drawing Sheets

ACTUATING DEVICE FOR THE FOLDING ROOF OF A MOTOR VEHICLE

BACKGROUND OF THE INVENTION

1. Field of the Invention

The invention relates to an actuating device for opening and closing the folding roof of a motor vehicle with a bearing carriage which is movably supported on the roof-side guideway and which is connected to the movable part of the folding roof, and with a drive means which is connected to the bearing carriage by means of a drive carriage which is supported on the roof-side guideway and a connecting rod arrangement which has a toggle lever and which is controlled by a control crank, on the last closing path, the connecting rod arrangement stepping down the drive motion of the drive carriage.

2. Description of Related Art

Published European Patent Application EP 0 755 815 A1 shows a folding roof with such an actuating device, in which a drive carriage which is movably guided along a guideway is coupled via a toggle lever to the bow carrier of the end bow of the folding roof. The end section of the guideway swings the toggle lever relative to the drive carriage as when approaching the closed position. The swinging of the toggle lever causes the drive motion of the drive carriage to be stepped down. Aerodynamic forces which attack the end bow with the folding roof closed can be transferred via the toggle lever to the drive carriage, and thus, to the drive motor.

SUMMARY OF THE INVENTION

The primary object of the present invention is to provide a locking device having a simple structure and with which the folding roof can be reliably closed, and especially in the closed position, reaction forces on the drive will be prevented.

This object is achieved in accordance with the invention in the aforementioned locking device in that the toggle lever of the connecting rod arrangement, which is pivotally connected to the pivot arm of the bearing carriage, can be moved along a control guideway into its closed position in which it is located in a self-locking manner with respect to the opening force which acts on the bearing carriage via the roof part. This prevents the aerodynamic forces, which act on the folding roof when driving and which load the roof part out of its closed position on the apron in the direction of opening, from being able to act on the drive carriage, and thus, for example, via the drive cable on the drive means, for example, an electric drive motor. By connecting the toggle lever to the bearing carriage via the pivot lever the toggle lever can be accommodated in a space-saving manner in or on the guideway of the drive carriage while it is being pushed over the essential actuation path. The toggle lever is swung out only when approaching the closed position, the drive force being transferred continuously to the bearing carriage via the likewise pivoting pivot arm.

This object is also achieved in the aforementioned locking device with respect to improved operation in accordance with the invention in that the roof part is movably supported by a bearing means on the bearing carriage and the actuating motion of the bearing means is controlled by an additional control guide. Thus, an individual pivoting motion, superimposed on the lengthwise displacement, can be transmitted to the roof part which can press during the closing process, for example, from the top against a seal on the apron.

Preferably, the toggle lever is pivotally connected to the drive carriage by means of an intermediate lever. By means of the intermediate lever, the possibilities for kinematic displacement and arrangement of the toggle lever in its operating positions are increased.

In one preferred embodiment, the toggle lever, in its closed position, adjoins the control guide and the hinge of the pivot arm is located on the toggle lever between the engagement surface and the hinge which supports the intermediate lever. In the locked position, the toggle lever is at top dead center with respect to the pivot arm and supports the engagement surface in which it acts in a self-locking manner against forces which can act from the roof part on the bearing carriage and the pivot arm.

Feasibly, the engagement surface of the toggle lever is formed as a circular arc and the control guide is formed, in the closed position of the toggle lever, by the opposing engagement surface, which is especially likewise circularly shaped.

Preferably, the toggle lever, especially its back end, in its closed position, adjoins a stop which is opposite the engagement surface. Thus, the closed position or the self-locking dead center or top dead center position is clearly defined.

One advantage with respect to installation space arises from the fact that the toggle lever and the intermediate lever are guided to be unable to pivot on the guide rail which contains the guideway over the important actuating path, and only when approaching the closed position, can they swing out from the guideway by control by means of the control crank.

Especially when the swivel bearing of the swivel arm is located on the bearing carriage clearly above the guideway of the drive carriage, are the relationships of the forces on the bearing carriage, the swivel arm and the toggle lever advantageous for the behavior of the actuating device in motion.

If, preferably, the roof part is movably supported on the bearing carriage by a bearing means and the actuating motion of the bearing means is controlled by an additional control guide, an individual pivoting motion superimposed on the lengthwise displacement can be transmitted to the roof part which can press in the closing process, for example, from the above, against a seal on the apron.

To do this, it is feasible if the bearing means contains two connecting rods in a four-bar mechanism arrangement and if one of the connecting rods is guided on the additional control guide. This connecting rod can have two engagement elements, such as, for example, rollers or sliders which are guided on the additional control crank.

The actuating means is fundamentally suitable for all types of folding roofs which can close a roof opening in a fixed roof or a lowerable roof.

Embodiments of the locking device are explained in detail below with reference to the accompanying drawings.

DETAILED DESCRIPTION OF THE INVENTION

Figure 1:
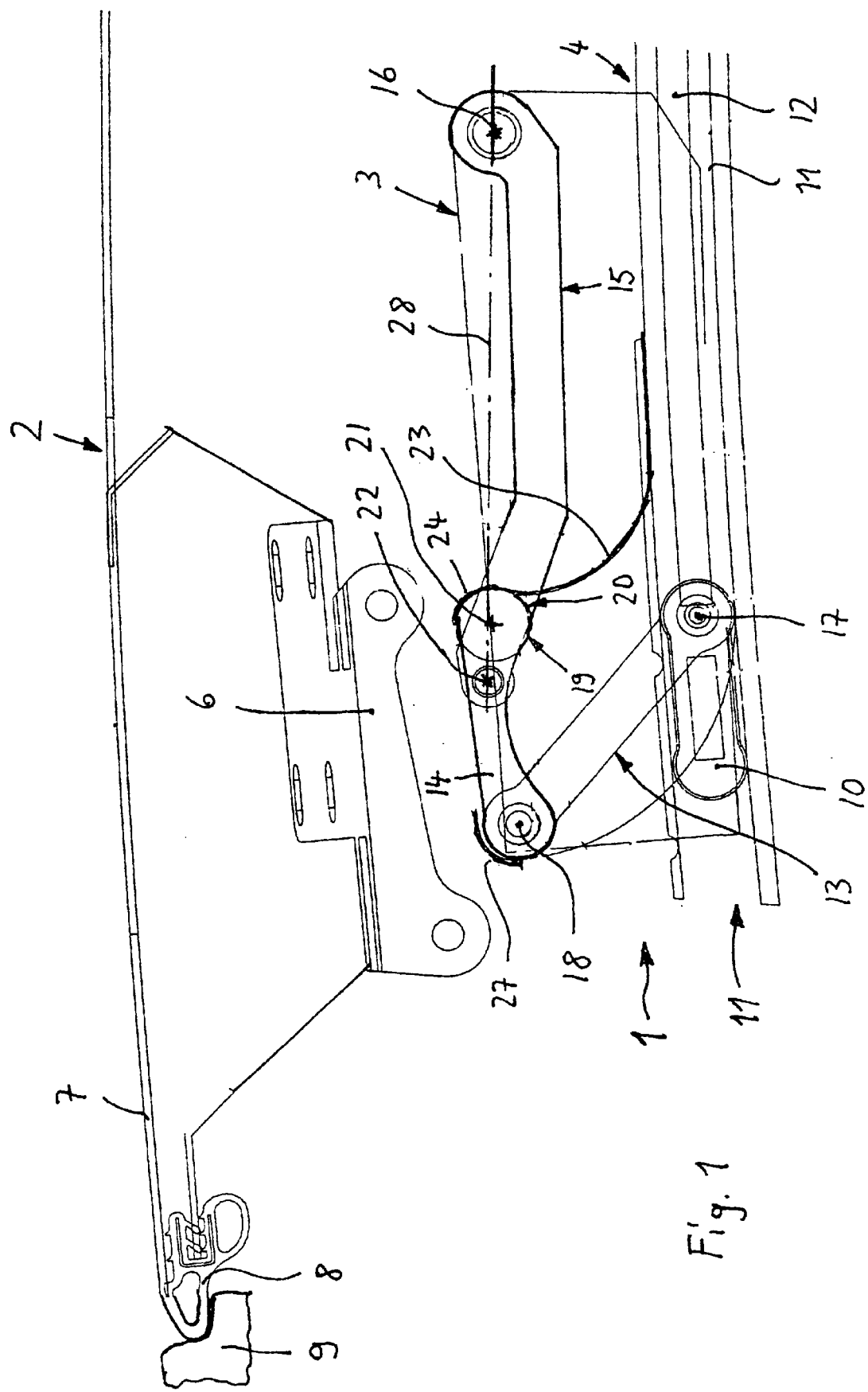
FIG. 1 is a schematic side view of a first embodiment of the actuating device with the roof tip of the folding roof of the motor vehicle in the closed position.

The actuating device 1 for opening and closing the folding roof 2 of a motor vehicle, for example, of a convertible, contains a bearing carriage 3 which is movably supported on a guideway 4 of a guide rail 5 which is attached to each lateral lengthwise roof member (not shown) of the motor vehicle. The lengthwise roof member is, for example, part of a fixed roof frame of a motor vehicle roof with a roof opening which can be selectively closed or at least partially opened by the folding roof 2, or it is a component of a roof which can be transferred into a rear deposited position, which can be moved from the closed position over the motor vehicle interior into the open position, and in which the side roof members can be swung in, for example, and can be deposited with the roof in a rear convertible top compartment.

The bearing carriage 3 is securely joined to a bearing plate 6 (the connection is not shown) to which the roof tip 7 of the folding convertible top 2 is securely attached. The roof tip 7 is the rigid front element of the folding convertible top 2 and its front edge carries a seal 8 which, in the closed state of the folding convertible top 2 (FIG. 1), tightly adjoins the apron 9 above the front window of the motor vehicle.

Furthermore, the actuating device 1 contains a drive carriage 10 which is movably guided on a second guideway 11 and is connected to a drive cable 12 which can be driven, for example, by an electric drive motor in a known manner in the opening and closing direction. The second guideway 11 is likewise formed or mounted on the guide rail 5 for the bearing carriage 3 or it is provided on an additional guide rail.

A connecting rod arrangement which has an intermediate lever 13 and a toggle lever 14 connects the drive carriage 10 to the pivot arm 15, which is pivotably coupled to the bearing carriage 3 by the hinge 16. The intermediate lever 13 is pivotably coupled, on the one hand, to the drive carriage 10 by means of a hinge 17, and on the other hand, is pivotably connected to the toggle lever 14 by means of a hinge 18. The end 19 of the toggle lever 14 opposite the hinge 18 is disc-shaped and contains an outer engagement surface 20 which lies on a segment of a circle with a center 21.

The connection of the pivot arm 15 to the toggle lever 14 forms a hinge 22 which is located on the toggle lever 14 between the center 21 of engagement end 19 and the opposing hinge 18.

Figure 4:
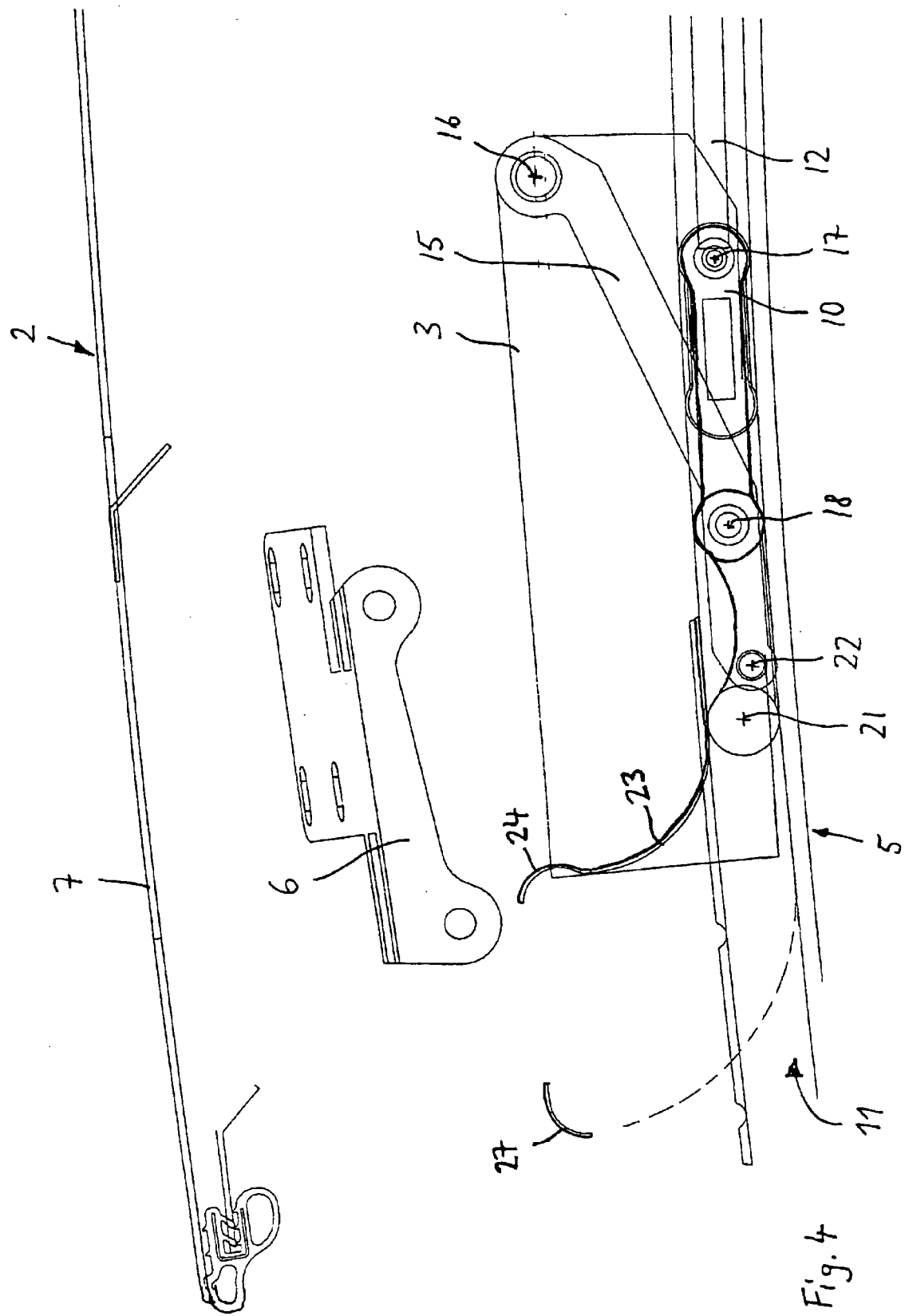
FIG. 4 is a side view of the actuating device after a further opening motion.
Figure 5:
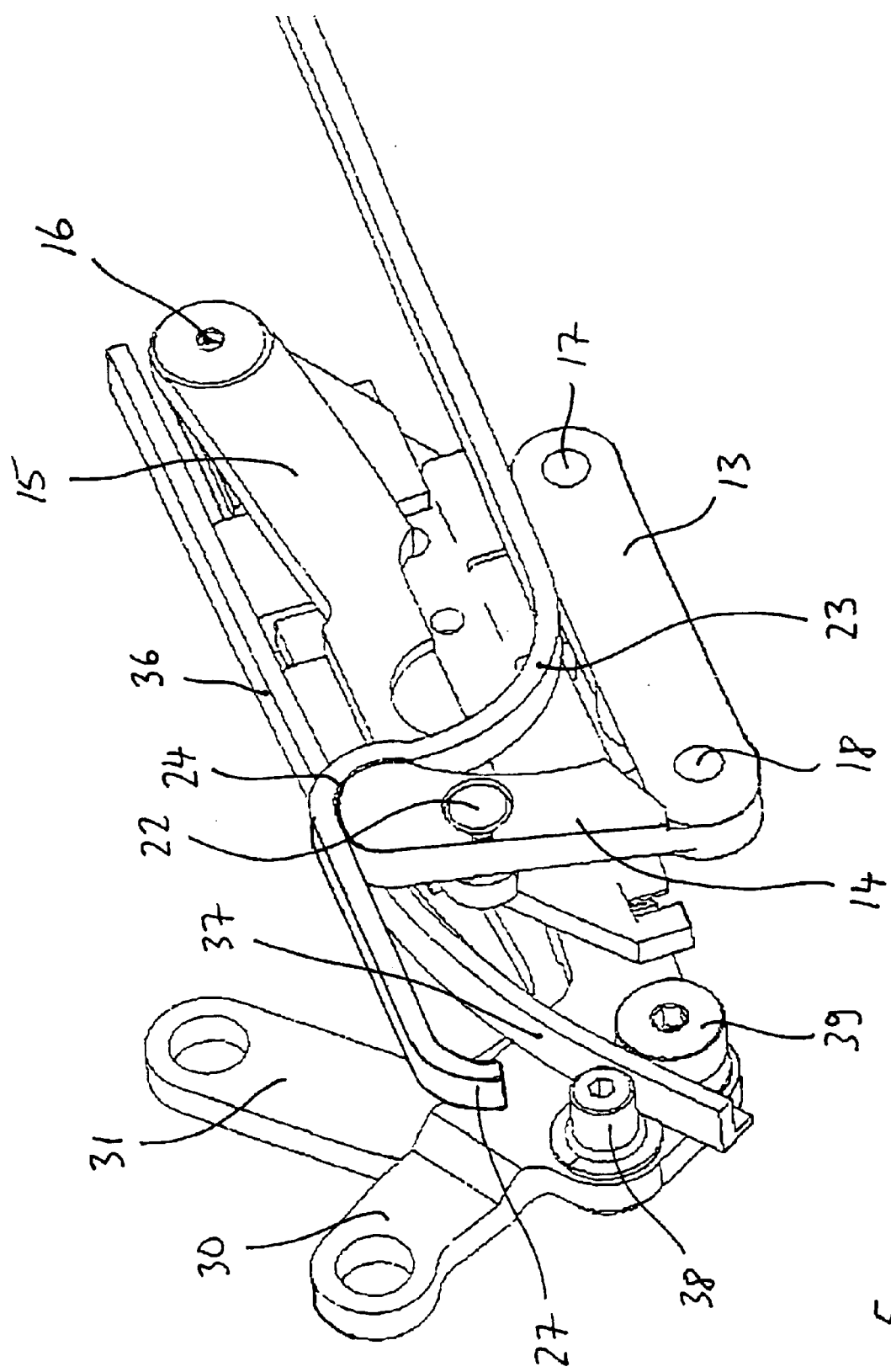
FIG. 5 is a perspective side view of a second embodiment of the actuating device in a position corresponding to that of FIG. 2 for the first embodiment.
Figure 6:
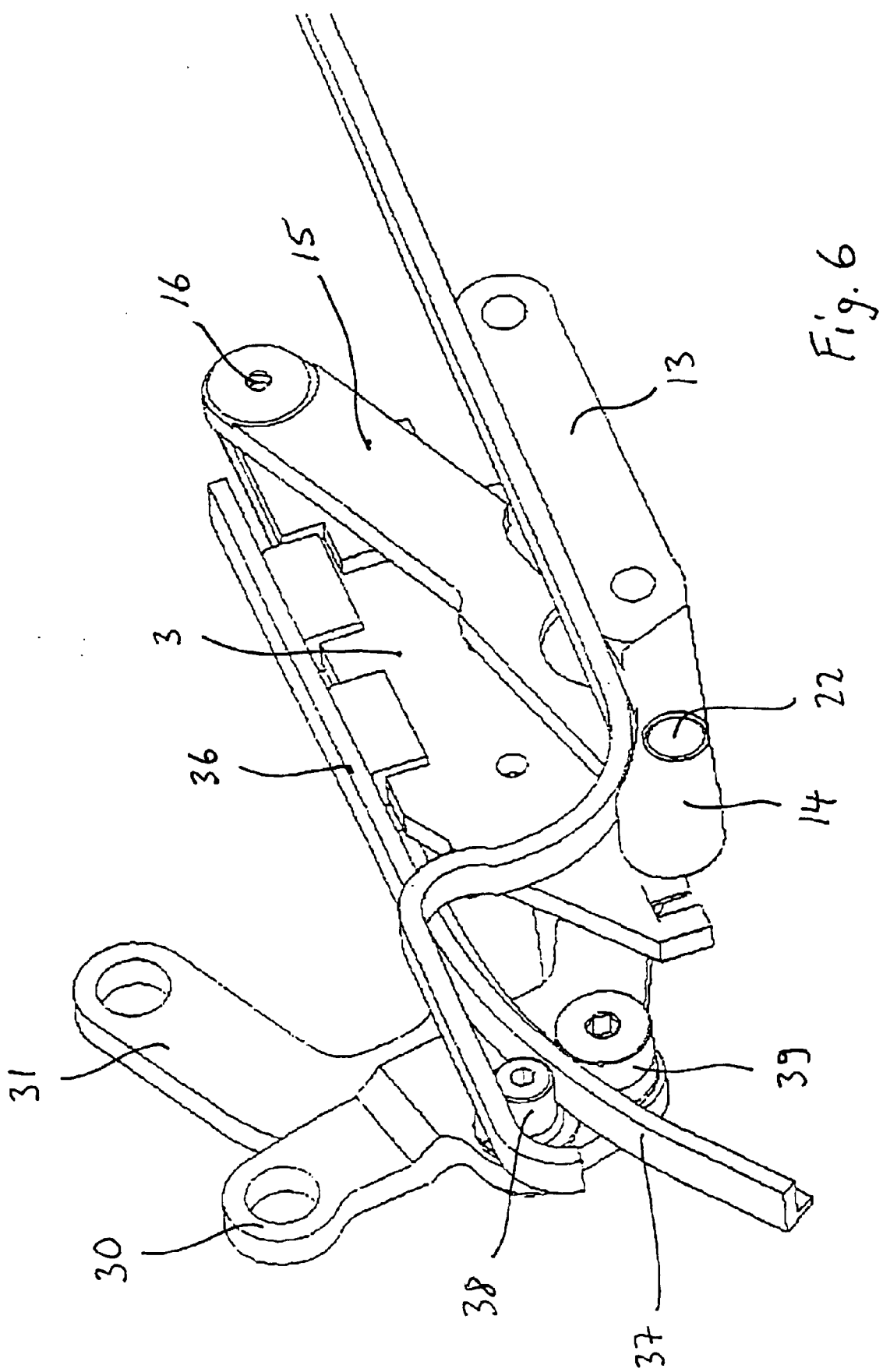
FIG. 6 is a perspective side view the second embodiment of the actuating device in the intermediate position when the roof tip is being opened.
Figure 7:
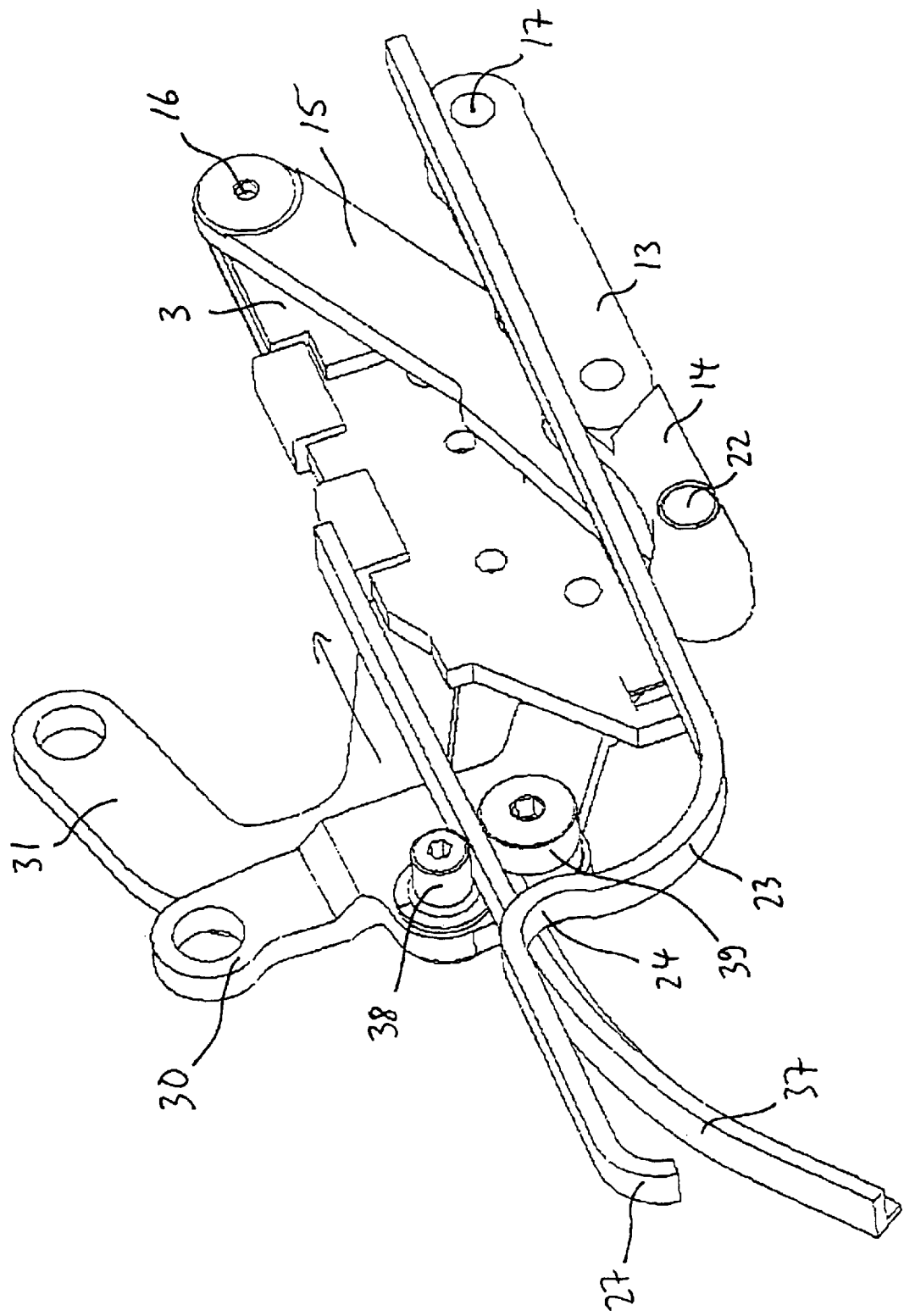
FIG. 7 is a perspective side view of the second embodiment of the actuating device in another intermediate position when the roof tip is being opened.

The intermediate lever 13 and the toggle lever 14 are made such that they are held in the second guideway 11 together with the drive carriage 10 in a lengthwise alignment (see FIG. 4) and cannot swing out if they are driven by the drive carriage 10 in the opening or closing motion along the guide rail 5. In this way, the bearing carriage 3 is rigidly coupled to the drive carriage 10 via the pivot arm 15, the toggle lever 14 and the intermediate lever 13 in the opening and closing direction.

Figure 3:
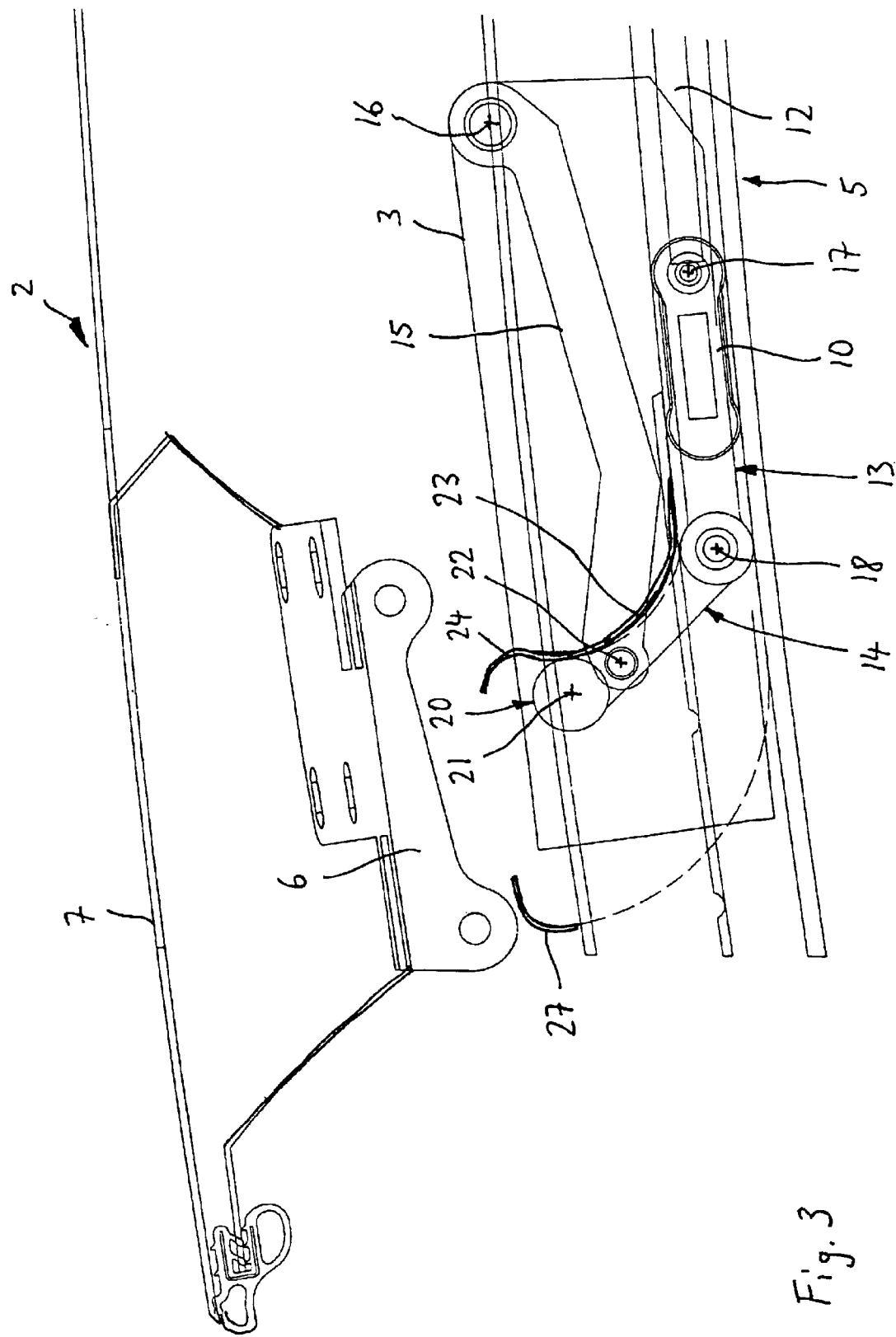
FIG. 3 is a side view of the actuating device which has been moved farther as compared to the position shown in FIG. 2.

On the front end of the guide rail 5, the second guideway 11 is upwardly open such that, during forward displacement of the drive carriage 10 (movement from FIG. 4 to FIG. 3) first the toggle lever 14 with its engagement end 19 upwardly emerges, and in doing so, slides with its engagement surface 20 along the cam-shaped control guide 23. The toggle lever 14 swings out upwardly as a result of the compressive force which is directed forward and which is applied to the toggle lever 14 via the drive carriage 10, and the opposing force which is directed toward the rear and which is applied by the tension of the convertible top on the bearing carriage 3, and thus, via the hinge 16 and the pivot arm 15 to the hinge 22 on the toggle lever 14. The vertical distance between the hinge 16 on the bearing carriage 3 and the guideway 11 or the hinge 22 on the toggle lever 14 yields an upward reaction force in the pivot joint 22, which swings the toggle lever 14 up and which guides it along the control guide 23. When the motion of the drive carriage 10 remains the same, the swinging-out of the toggle lever 14 and consequently of the swivel arm 15 leads to a reduction of the advancing motion of the bearing carriage 3 relative to the drive carriage 10. This stepping down of motion at the same time represents a stepping up of the force.

Figure 2:
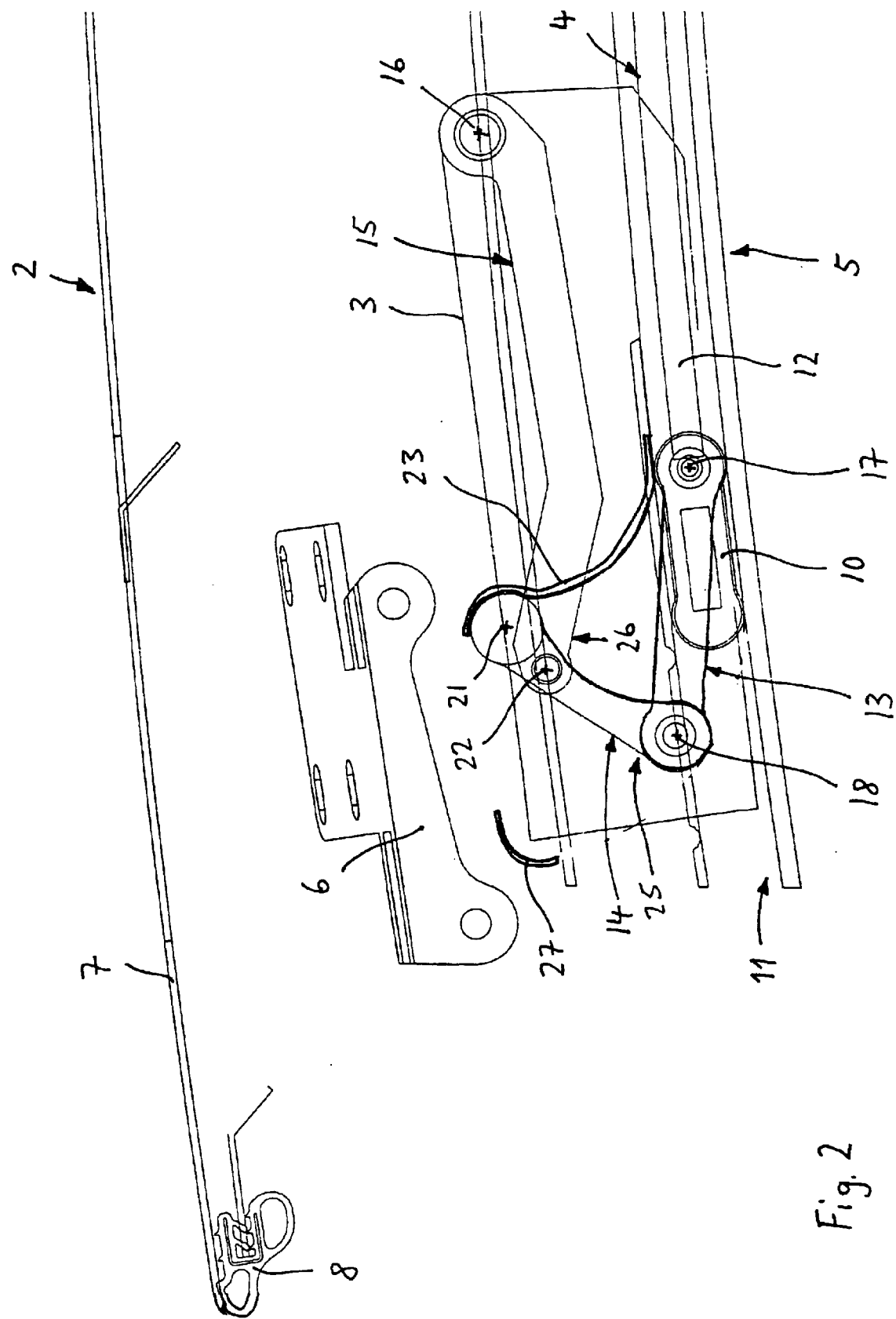
FIG. 2 is a side view of the actuating device shown in FIG. 1 in the opening process.

The toggle lever 14 moves with its engagement end 19 as far as the circle segment-shaped support surface 24 of the control guide 23 (FIG. 2) on which the engagement surface 20 of the toggle lever 14 is blocked against further upward displacement, but can be pivoted in this blocked position. Via the intermediate lever 13 which is lifted likewise out of the second guideway 11, the drive carriage 10, which has continued to move now, swings the back end 25 of the toggle lever 14 around the engagement end 19 of the toggle lever 14 which is held on the support surface 24, the front end 26 of the pivot arm 15 being lifted with the hinge 22, and in doing so, however, executing only a small horizontal component of motion. The drive carriage 10 remains guided in its guideway 11 during the swinging motions of the intermediate lever 13 and of the toggle lever 14.

In the front end position of the actuating device (closed position as shown in FIG. 1), the toggle lever 14 and/or the intermediate lever 13, in the area of their common hinge 18 adjoin a stop 27 which is formed, for example, on the guide rails 5. The toggle lever 14 is then aligned such that a connecting line 28 between the hinge 22 on the toggle lever 14 and the hinge 16 of the pivot arm 15 on the bearing carriage 3 is located above the center 21 of the of engagement end 19 of toggle lever 14. Thus, self-locking is achieved, since a force which is applied toward the rear via the bearing carriage 3, for example, a rearwardly directed force produced by the airstream which acts on the roof tip 7 or the folding convertible top 2, would load the toggle lever 14 in a clockwise direction around the center 21, as shown in FIG. 1, and thus, will press it more strongly against the stop 27. Transfer of this force to the drive carriage 10 is thus prevented and the drive cable 12 and the further drive means are thus relieved.

The actuating device 1 thus enables stepping down of the advance motion of the bearing carriage 3 and thus of the roof tip 7 relative to the drive carriage 10 on the last closing path when the advance of the drive, and thus, of the drive cable 12 and of the drive carriage 10, is constant while, at the same time, the closing force is increased.

Since the intermediate lever 13 and the toggle lever 14 swing only out of the guideway 11 in the front segment of the guide rail 5 and otherwise are guided on or in the guideway 11, only a small amount of space is required for the guide rail 5 with the flat guideway 11.

Figure 8:
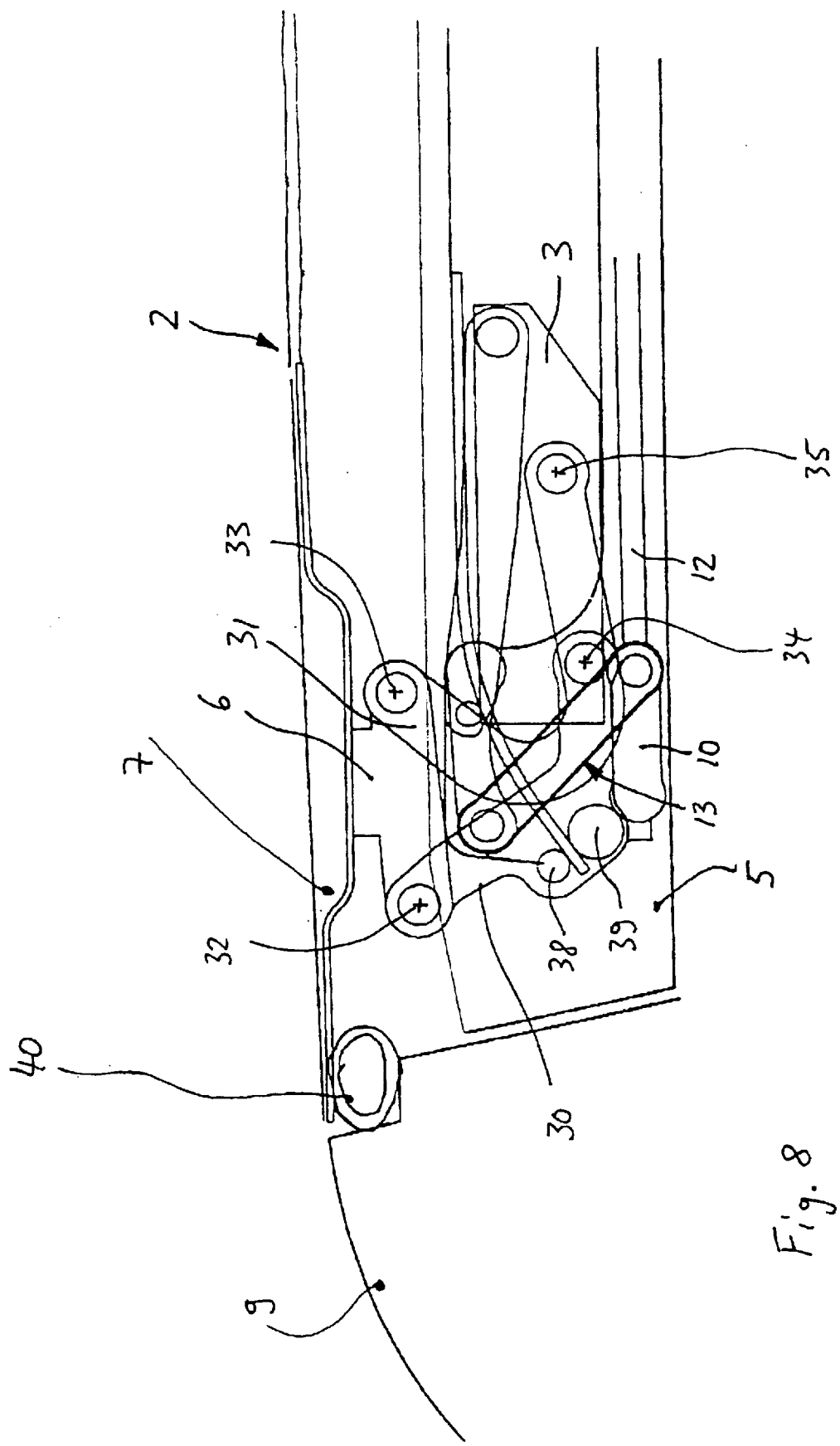
FIG. 8 is a side view of the second embodiment of the actuating device in the closed position corresponding to that shown in FIG. 1.
Figure 9:
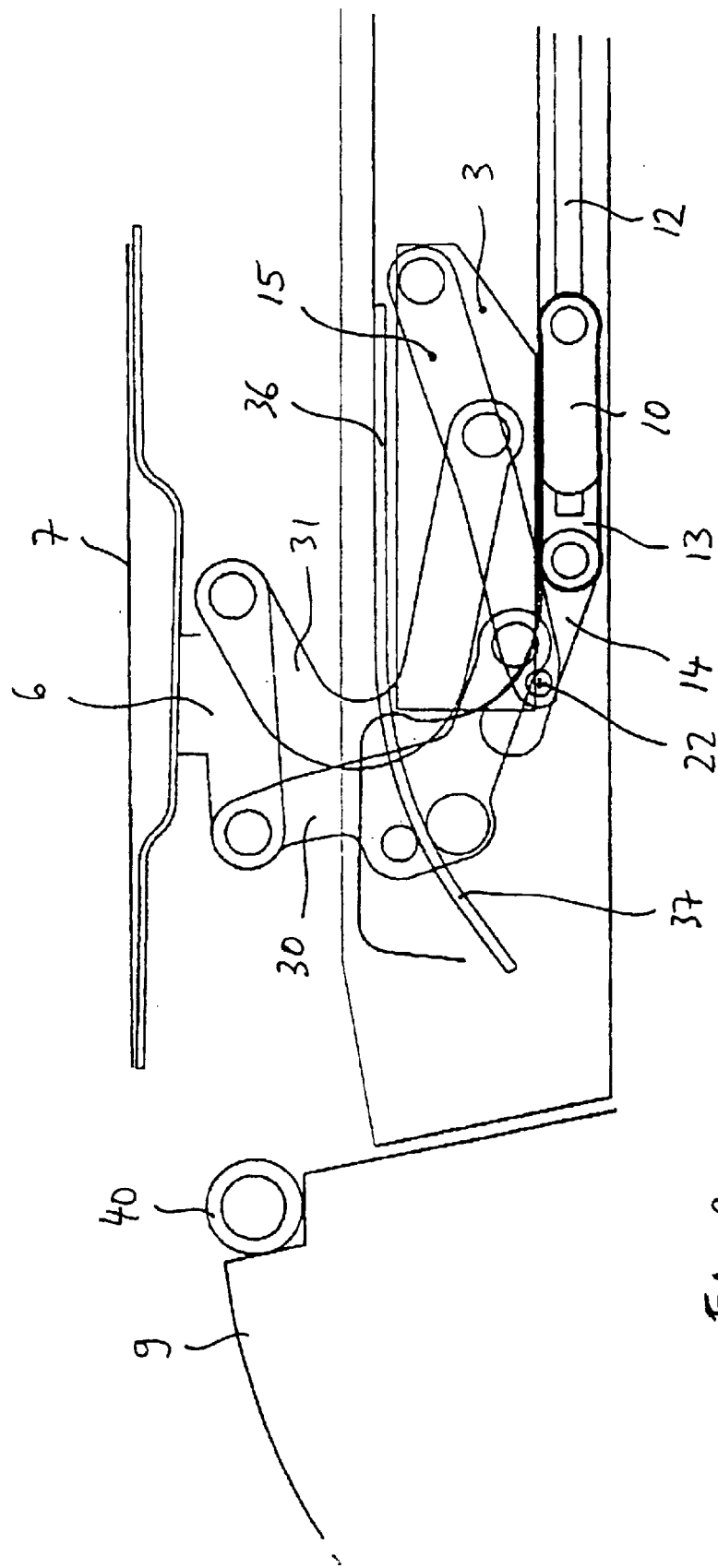
FIG. 9 is a schematic side view of the second embodiment of the actuating device in the position shown in FIG. 6.
Figure 10:
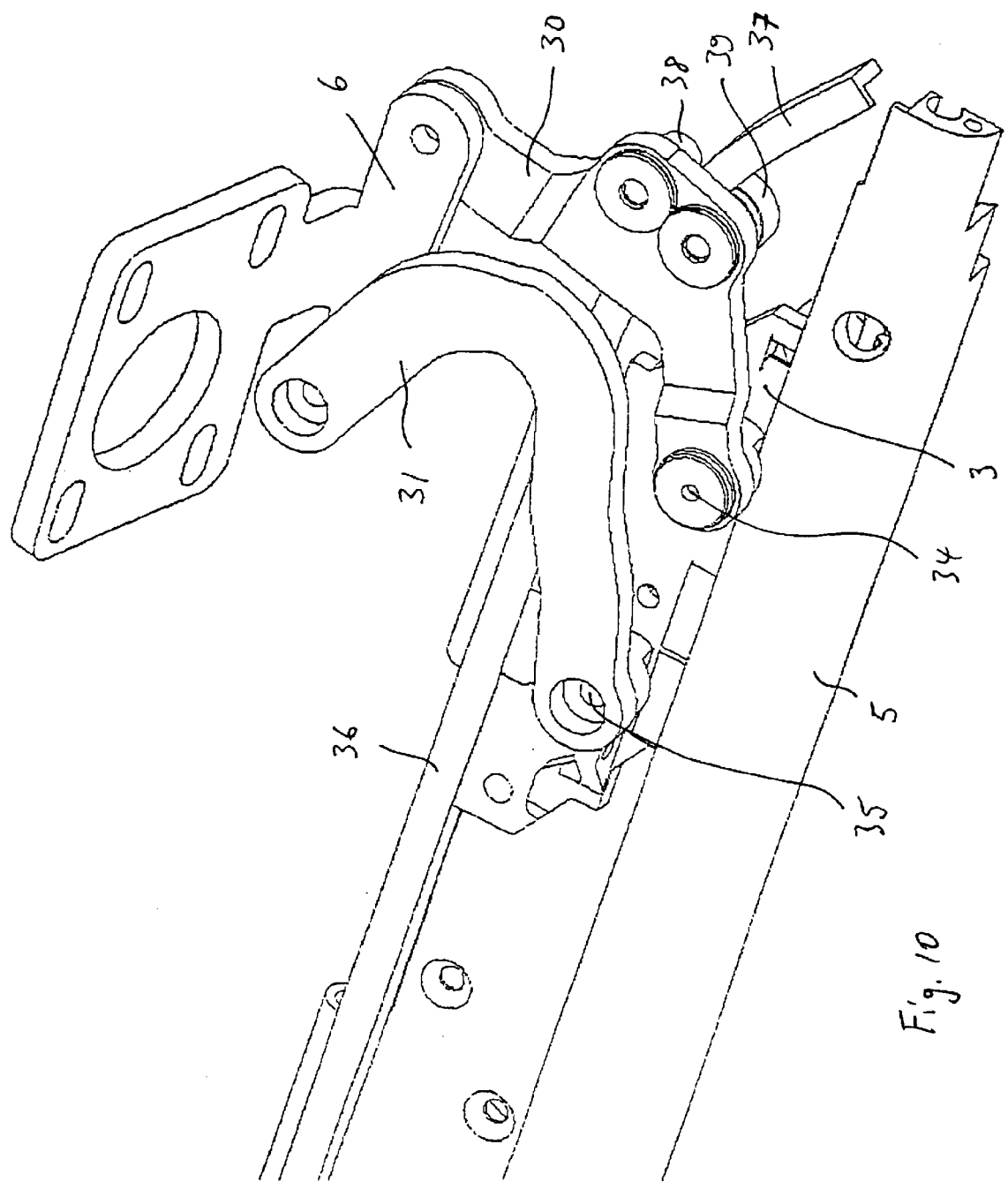
FIG. 10 is a perspective inside view of the second embodiment of the actuating device in the position shown in FIG. 6.

One modified embodiment of the above described actuating device (see FIGS. 5 to 10) contains the movable coupling of the roof tip 7 to the bearing carriage 3. To do this, the bearing plate 6 which is permanently joined to the roof tip 7 is movably supported by means of a four-bar mechanism arrangement on the bearing carriage 3. The four-bar mechanism arrangement contains a front control lever 30 and a rear connecting rod lever 31 which are movably supported by means of the first hinges 32, 33 (FIG. 8) on the bearing plate 6 and by means of second hinges 34, 35 on the bearing carriage 3. A second control guide 36 is formed or mounted on the guide rail 5 and runs over almost the entire length of the guide rail 5 parallel to the guideway 4 of the bearing carriage 3, but on the front segment of the guide rail 5 has a curved guide segment 37 which approaches against the guideway 11. The control lever 30 is movably engaged to this control guide 36, for example, by means of two engagement elements, such as sliders or rollers 38, 39 between which is a gap formed in which the control guide 36 is held without play.

According to the embodiment shown, the four-bar mechanism arrangement is chosen and designed such that the roof tip 7, during displacement along the guide rail 5, is raised relative to it, and on the front segment of the guide rail 5, is lowered relative to the closed position (see FIG. 8) and in addition is swung down at its front edge so that the front edge is pressed from obliquely above against the seal 40 on the apron 9.

What is claimed is:

1. Actuating device for opening and closing a folding roof of a motor vehicle, comprising:
    a roof-side guideway adapted for attachment to a fixed vehicle roof structure;
    a bearing carriage which is movably supported on the roof-side guideway and which is adapted to be connected to a movable part of the folding roof, and
    a drive means which is connected to the bearing carriage by a drive carriage which is supported on the roof-side guideway and a connecting rod arrangement which has a toggle lever and which is controlled by a control guide, the connecting rod arrangement being adapted to step down drive motion of the drive carriage on a last portion of a closing path,
    wherein the toggle lever of the connecting rod arrangement is pivotally connected to a pivot arm of the bearing carriage and is movable along the control guide into a closed position thereof, in which the toggle lever is self-locking with respect to opening forces which act on the bearing carriage, in an installed state of the device, via the roof part,
    wherein the toggle lever has an engagement surface which adjoins the control guide in the closed position, and wherein, in the closed position, the toggle lever adjoins a stop which is opposite the engagement surface.

2. Actuating device as claimed in claim 1, wherein a bearing means is provided on the bearing carriage and an actuating motion of the bearing means is controlled by a second control guide.

3. Actuating device as claimed in claim 2, wherein the bearing means contains two connecting rods of a four-bar mechanism arrangement, and wherein one of the connecting rods is guided on the second control guide.

4. Actuating device as claimed in claim 3, wherein said one of the connecting rods has two engagement elements that are guided on the second control guide.

5. Actuating device for opening and closing a folding roof of a motor vehicle, comprising:
    a roof-side guideway adapted for attachment to a fixed vehicle roof structure;
    a bearing carriage which is movably supported on the roof-side guideway and which is adapted to be connected to a movable part of the folding roof; and
    a drive means which is connected to the bearing carriage by a drive carriage which is supported on the roof-side guideway and a connecting rod arrangement which has a toggle lever and which is controlled by a control guide, the connecting rod arrangement being adapted to step down drive motion of the drive carriage on a last portion of a closing path,
    wherein the toggle lever of the connecting rod arrangement is pivotally connected to a pivot arm of the bearing carriage and is movable along the control guide into a closed position thereof in which the toggle lever is self-locking with respect to opening forces which act on the bearing carriage, in an installed state of the device, via the roof part, wherein the toggle lever is pivotally connected to the drive carriage by an intermediate lever.

6. Actuating device as claimed in claim 5, wherein the toggle lever has an engagement surface which adjoins the control guide in the closed position, and wherein a hinge connection of the pivot arm to the toggle lever is located between the engagement surface and a hinge connection between the intermediate lever and the toggle lever.

7. Actuating device as claimed in claim 6, wherein the engagement surface of the toggle lever has a circular arc shape and the control guide has an opposing engagement surface for receiving the engagement surface in the closed position of the toggle lever.

8. Actuating device as claimed in claim 5, wherein the toggle lever and the intermediate lever are guided in the guideway by the control guide in a manner preventing pivoting thereof until each reaches said last portion of the closing path where the toggle lever and the intermediate lever are released to swing out from the guideway.

9. Actuating device for opening and closing a folding roof of a motor vehicle, comprising:
    a roof-side guideway adapted for attachment to a fixed vehicle roof structure;
    a bearing carriage which is movably supported on the roof-side guideway and which is adapted to be connected to a movable part of the folding roof, and
    a drive means which is connected to the bearing carriage by a drive carriage which is supported on the roof-side guideway and a connecting rod arrangement which has a toggle lever and which is controlled by a control guide, the connecting rod arrangement being adapted to step down drive motion of the drive carriage on a last portion of a closing path,
    wherein the toggle lever of the connecting rod arrangement is pivotally connected to a pivot arm of the bearing carriage and is movable along the control guide into a closed position thereof, in which the toggle lever is self-locking with respect to opening forces which act on the bearing carriage, in an installed state of the device, via the roof part, wherein the pivot arm has a pivot bearing which is located on the bearing carriage above said guideway.

10. Folding roof of a motor vehicle having a movable roof part, said roof comprising:
- a roof-side guideway attached to a fixed vehicle roof structure;
- a bearing carriage which is movably supported on the roof-side guideway and which is connected to the movable roof part of the folding roof, and
- a drive means which is connected to the bearing carriage by a drive carriage which is supported on the roof-side guideway and a connecting rod arrangement which has a toggle lever and which is controlled by a control guide, the connecting rod arrangement being adapted to step down drive motion of the drive carriage on a last portion of a closing path,
- wherein the toggle lever of the connecting rod arrangement which is pivotally connected to a pivot arm of the bearing carriage is movable along the control guide into a closed position thereof, in which the toggle lever is self-locking with respect to opening forces which act on the bearing carriage, in an installed state of the device, via the roof part;
- wherein the toggle lever is pivotally connected to the drive carriage by an intermediate lever;
- wherein the toggle lever has an engagement surface which adjoins the control guide in the closed position, and wherein a hinge connection of the pivot arm to the toggle lever is located between the engagement surface and a hinge connection between the intermediate lever and the toggle lever.

11. Folding roof as claimed in claim 10, wherein the roof part is movably supported by a bearing means on the bearing carriage and an actuating motion of the bearing means is controlled by a second control guide.

12. Folding roof as claimed in claim 11, wherein the bearing means contains two connecting rods of a four-bar mechanism arrangement, and wherein one of the connecting rods is guided on the second control guide.

13. Folding rood as claimed in claim 12, wherein said one of the connecting rods has two engagement elements that are guided on the second control guide.

* * * * *